May 19, 1925.                M. C. SCHWEINERT                1,538,062
                          PUMP COUPLING OR THE LIKE
                             Filed Oct. 9, 1920

Inventor
Maximilian Charles Schweinert
By his Attorneys,
Fraser, Turk & Myers

Patented May 19, 1925.

1,538,062

UNITED STATES PATENT OFFICE.

MAXIMILIAN CHARLES SCHWEINERT, OF NEW YORK, N. Y.

PUMP COUPLING OR THE LIKE.

Application filed October 9, 1920. Serial No. 415,883.

*To all whom it may concern:*

Be it known that I, MAXIMILIAN CHARLES SCHWEINERT, a citizen of the United States of America, residing in the borough of Manhattan, city, county, and State of New York, have invented certain new and useful Improvements in Pump Couplings or the like, of which the following is a specification.

This invention relates particularly to pump couplings, although it is applicable to dust caps, rim nuts and other devices which it is desired to connect with another part.

The object of the invention is to provide a device of this character which shall be equally applicable to another part, and particularly to a threaded part such as the casing of a pneumatic tire valve.

Various constructions have heretofore been provided for obtaining a quick attachment and detachment to the tire valve, but many of these have been objectionable for one reason or another. By the present construction I obtain the greatest celerity in connection and disconnection, with great security in holding to the valve.

In the preferred construction, as applied to a pump coupling, the device comprises a coupling end preferably unthreaded, which fits down over the valve nipple. A section of the coupling end is preferably cut away to admit a dog or catch to project into the bore of the coupling. Means are provided for urging the dog forwardly to engage the thread of the valve casing, which means preferably comprise a camming collar mounted at the end of the coupling. The camming collar preferably also acts to retract the dog. The invention also includes other features of improvement which will be hereinafter more fully described.

Referring to the drawing, which shows one embodiment of the invention,—

Figures 4, 5, 6:
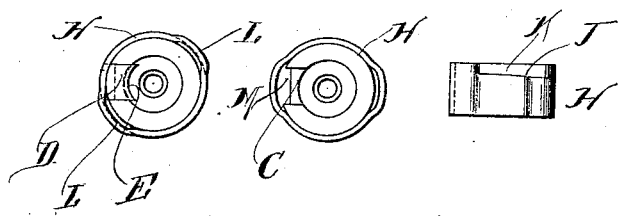
Fig. 4 is a bottom view of the coupling, with the dog advanced.
Fig. 5 is a similar view with the dog omitted.
Fig. 6 is an elevation of the camming collar.
Figure 7:
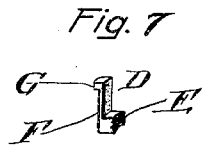
Fig. 7 is a perspective view of the dog.
Figure 8:
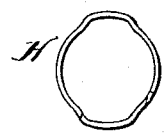
Fig. 8 is a bottom view of the camming collar.

Referring to the drawings, let A indicate the body of the coupling, which is provided with the usual shank for engagement with a rubber hose. The lower end of the coupling body is enlarged and formed with a bore B which is adapted to pass over the end of a tire valve nipple, the walls of the bore B being preferably unthreaded so as to slip easily over the valve nipple without tilting or canting. The body of the coupling is best recessed, as shown at C, to receive a dog D, the inner edge E of which is adapted to project into the bore B to engage the valve nipple, and to be retracted therefrom to release the valve nipple. A suitable form of dog is illustrated wherein the face E is provided with threads adapted to engage the valve threads. The dog is also provided with a shank F which lies longitudinally along the side of the coupling, and a projection G which extends at right angles to the coupling. In the preferred construction a camming collar H is provided which surrounds the lower part of the coupling, and in most part the dog D. Such collar may be slotted at its upper edge, as shown at J, to receive the projection G of the dog. The lower wall of the slot J is formed as a cam face K which is adapted to operate on such projection. The camming collar H is preferably formed with a cam face L, as shown in Fig. 4, which cam face may be duplicated on the opposite side for purposes of symmetry. When the collar is formed of sheet metal this will produce on the outside of the collar two projecting portions which are adapted to act as finger-holds for use in rotating the collar. The purpose of the cam face L is to move the dog inwardly into engaging position; the purpose of the cam face K is to bear longitudinally against the projection G on the dog and thus tilt the dog outwardly sufficiently to clear the threads of the valve nipple.

In operation, to apply the device the collar is turned to the position wherein the back of the dog is received in the recess M of the collar. In this movement the dog has been tilted back by operation of the cam face K. The device is then slipped over the end of the nipple and the collar turned slightly to cam the dog into its forward or engaging position. At the same time the cam face K has released the projection, so that this forward tilting movement is possible. When it is desired to remove the coupling, the cam collar is turned back to reverse these operations, whereupon the coupling may be easily removed.

A very slight turn on the camming collar is all that is necessary in order to apply or release the coupling.

Figure 1:
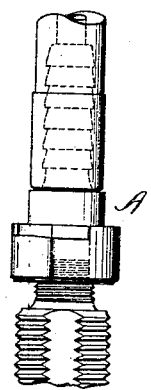
Figure 1 is an elevation.
Figure 3:
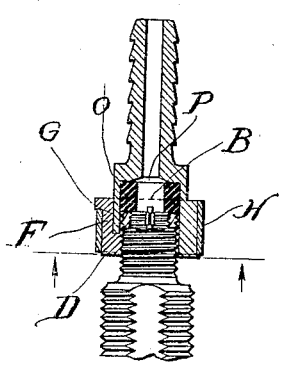
Fig. 3 is a similar section showing the dog in its engaging position.
Figure 2:
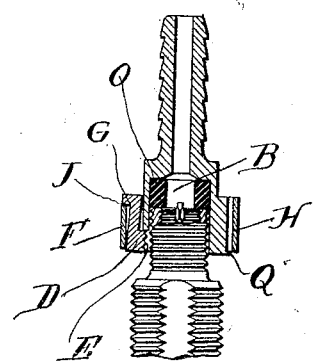
Fig. 2 is a longitudinal section showing the dog in its retracted position.

When the invention is applied to a pump coupling, a rubber or other soft washer O is provided on the interior, as best seen in Fig. 2, which rubber washer makes contact with the top of the valve nipple and this ensures a tight joint. By pressing the coupling firmly down on the valve nipple, sufficient pressure may be put upon it to insure such tight joint. I prefer, however, that the rubber washer shall be acted upon by the internal pressure in such manner as to make a tight joint without the necessity of pressing down the coupling. This permits of a fairly loose connection to be made between the coupling and valve, and thus promotes the ease of application and removal. If the washer is sufficiently soft and long, the internal pressure upon it will tend to flatten it circumferentially so as to decrease its thickness in a radial direction, while at the same time this circumferential flattening produces a longitudinal extension sufficient to make a tight joint. Or the rubber may have a piston action under the pressure which tends to move it bodily against the valve nipple. In this case the coupling is best made with a recess P which is larger than the hole through the packing, in order that its upper face may be subjected to the pressure of air, as best shown in Fig. 2. The collar may be maintained in place against upward movement by the projection G, and against downward movement by a lip Q formed on the coupling body.

In practice, the device is applied with greatest ease, since it is only necessary to slip the coupling down over the valve and turn the collar a quarter of a turn or less, without pressing downwardly upon the coupling. In removal, a reverse turning of the collar is sufficient to disengage the parts.

As before stated, the invention is applicable to dust caps, rim nuts, or other devices which it is desired to apply to other parts, particularly where such parts have a thread or other means of engagement.

It will be understood that many modifications may be made in the structure illustrated without departing from the invention. For instance, the thread or other engaging means instead of being upon the dog may be in the body of the coupling; or it may be on both, or more than one dog may be used, if desired.

What I claim is:—

1. A pump coupling or the like having a tiltable dog, a circular band surrounding the dog and adapted to cam the dog, said dog having a body portion extending substantially parallel to the axis of the coupling and a projection at one end of the dog movable in a recess in the circular band.

2. A pump coupling or the like having a movable part adapted to engage a thread and a camming collar for moving said part into and out of engagement with the thread, said collar having a part of its wall formed with a cam face and a part of its edge formed with a cam face.

3. A pump coupling or the like having a movable part adapted to engage a thread and a collar having a cam face in its wall for moving said part into engagement with the thread and a cam face on its edge for moving said part out of engagement with the thread.

In witness whereof I have hereunto signed my name.

MAXIMILIAN CHARLES SCHWEINERT.